Dec. 22, 1925.
V. BENDIX ET AL
1,566,954
BRAKING MECHANISM
Filed May 15, 1924
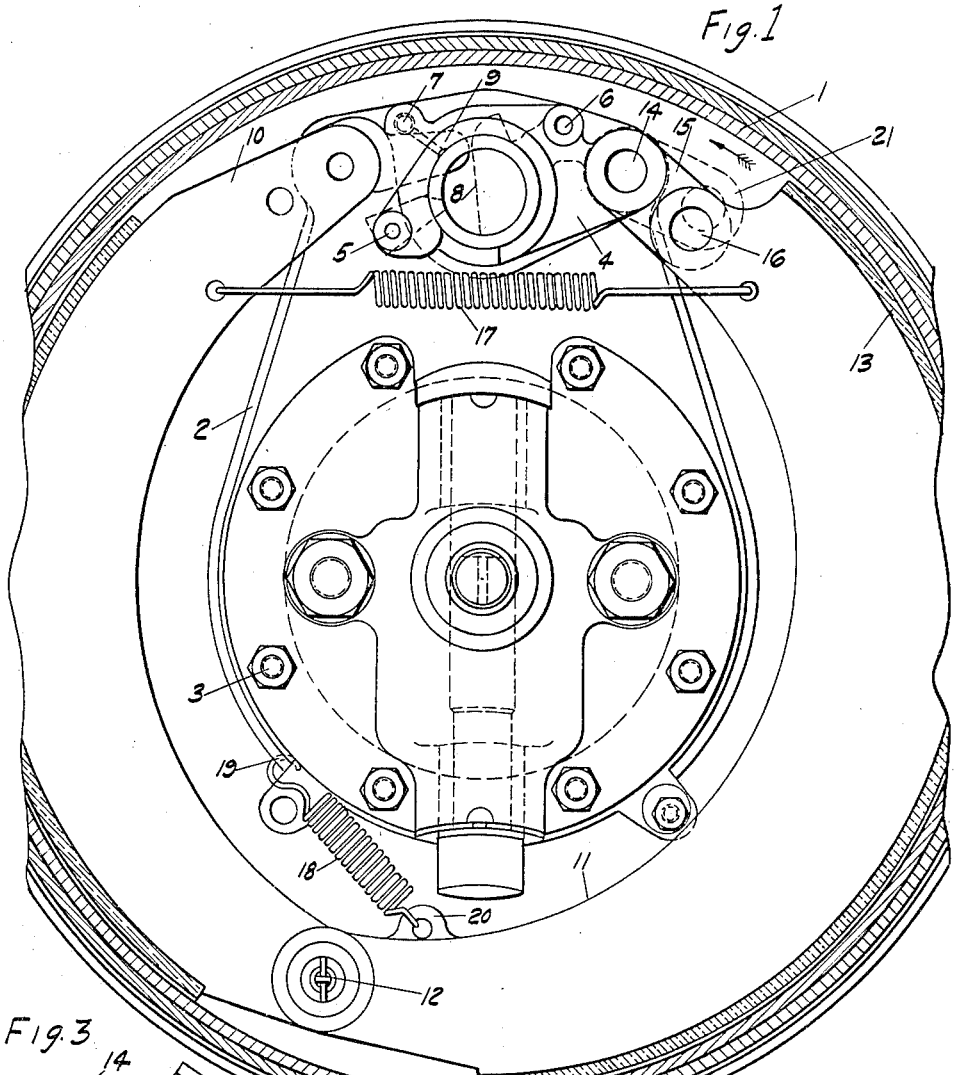
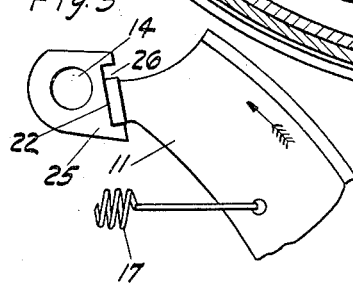
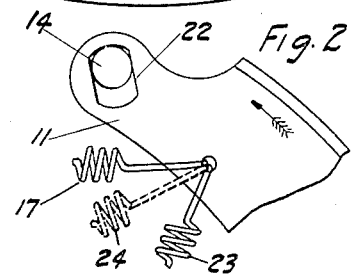
INVENTORS
VINCENT BENDIX
ADIEL Y. DODGE
BY
A. D. T. Libby
ATTORNEY Patented Dec. 22, 1925.

1,566,954

UNITED STATES PATENT OFFICE.

VINCENT BENDIX, OF CHICAGO, ILLINOIS, AND ADIEL Y. DODGE, OF SOUTH BEND, INDIANA, ASSIGNORS TO BENDIX BRAKE COMPANY, OF CHICAGO, ILLINOIS, A CORPORATION OF ILLINOIS.

BRAKING MECHANISM.

Application filed May 15, 1924. Serial No. 713,429.

*To all whom it may concern:*

Be it known that we, VINCENT BENDIX and ADIEL Y. DODGE, citizens of the United States, residing at Chicago and South Bend, respectively, in the counties of Cook and St. Joseph, respectively, States of Illinois and Indiana, respectively, have invented certain new and useful Improvements in Braking Mechanisms, of which the following is a description, reference being had to the accompanying drawing and to the figures of reference marked thereon.

This invention relates to improvements in the application of brake shoes to brake drums, and as set forth herein is particularly adapted for use in connection with automotive vehicles.

In the general use of internal brake shoes, they are usually pivoted at one end and expanded by a cam operating between the opposite ends of the shoes, and it is well known that such a construction gives little clearance between the shoes and the drums near the anchor point, and it is further well known that brake shoes so mounted do not wear out the brake lining at this point and this fact shows conclusively that the full brake surface of the shoe is not utilized. Hence, the maximum braking effort cannot be obtained.

It is one of the objects of this invention to provide means, whereby at least one of the internal brake shoes may have a greater movement at the end where it is pivoted or anchored, than in the ordinary construction, and this movement to be of such a nature as to allow the brake shoe or shoes to be applied with substantially the same effectiveness at the point closely adjacent the pivot or anchorage, as the other parts of the brake shoe.

It is a hard matter in the manufacture of brake drums to get them truly concentric and it is likewise much harder to get the drums to run perfectly concentric with the axis of rotation. Consequently there is always a tendency for the brake shoes to drag more or less and it is, therefore, another object of our invention to provide a mounting or anchorage for the brake shoe or shoes, which will allow greater normal clearance between the brake shoes and the drum without detriment to the effectiveness of the brake shoe when applying the same to the drum.

In order to illustrate our invention, we have chosen to show the same in connection with the Perrot-Farman servo type of brakes, although it is to be distinctly understood that our invention can be applied to various other forms of brake shoes or brake mechanisms.

The result may be accomplished in a number of ways, one of which is shown in Figure 1, which is a side elevation of the left wheel of a vehicle looking from the wheel side, the wheel side of the drum being cut away. A short link is inserted between the brake shoe and the anchor pin.

Another form is shown in Figure 2, in which the end of the brake shoe is adapted to slide on the anchor pin and turn thereabout; while Figure 3 shows another form in which the brake shoe slides on an anchorage plate which is adapted to move pivotally on an anchor pin.

Referring now to the details wherein like numbers refer to corresponding parts in the various views, 1 illustrates the interior portion of a brake drum. 2 is a carrier plate fastened by bolts 3 to the axle end of the wheel spindle. The plate 2 supports a carrier bracket 4 through the medium of bolts, or their equivalent, passing through the holes 5, 6 and 7. The carrier bracket 4 supports a cam 8, shown in dotted lines, which is adapted to engage the cam piece 9 carried on the brake shoe 10. In this particular type of brake shoe the shoe is made up of two parts 10 and 11, these parts being pivoted together at 12, forming a floating pivot. The brake shoes 10 and 11 are provided with a friction material 13 in the usual manner. Instead of anchoring the end of the brake shoe 11 directly to the anchor bolt 14 in the carrier bracket 4, we have inserted a link 15 which is pivoted at one end on the bolt 14 and at the other end on the bolt 16 in the brake shoe 11. A spring 17 anchored in the shoes 10 and 11 acts to hold the carrier end of the brake shoe away from the drum 1, and a spring 18, having one end connected at 19 to the carrier plate 2 and the other end to an ear 20 on the brake shoe 11 near the pivot 12, acts to withdraw the shoes out of contact with the drum after the cam 8 has been released. The link 15 is set at such an angle that the force along the brake shoe, caused by either the manual effort applied to the cam 8 or the servo force received from the drum, causes the link to move outwardly to the position shown by dotted line 21, thereby allowing this end of the brake shoe to move laterally as well as pivotally into engagement with the drum 1, it being understood of course that in this type of brake the application of the cam 8 to the brake shoe 10 causes the floating pivot 12 to move to the right, the direction of rotation of the drum being indicated by the arrow, thereby producing the movement of the link 15 as described.

A similar action can be secured by the construction shown in Fig. 2 in which the end of the brake shoe 11 is anchored to the pivot pin through the medium of a socket forming an inclined plane surface 22. In this construction in addition to the spring 17, a spring 23 may be utilized, or a resultant spring 24, shown in dotted lines, may be used. The effect of the spring is to withdraw the shoe 11 to the limit of movement on one part of the inclined plane.

In Fig. 3 similar action is secured by providing a pivotal block 25, which is pivoted on the anchor pin 14, the end of the shoe 11 being formed to fit in a slot 26 in the block 25, and spring 17 or its equivalent arrangement acting to hold the shoe 11 on the inclined plane 22 at the limit of its movement in one direction.

By thus arranging the end of the brake shoe 11 so that it will have both pivotal and lateral movement, we can obtain greater clearance than in the ordinary construction between the brake shoe and drum, thereby eliminating "dragging," yet due to the compound action, we are able to utilize substantially all of the surface of the brake shoe in an effective manner.

From what has been said, it will be appreciated that our invention is susceptible of a number of changes and we, therefore, do not wish to be limited to the exact details shown and described herein.

Having thus described our invention, what we claim is:

1. A brake comprising, in combination, a drum, a shoe pivotally anchored at one end within the drum in a manner permitting the anchored end to move radially against the drum, an unanchored shoe, a connection operated by the unanchored shoe to force the anchored shoe against the drum, and means to force the unanchored shoe against the drum.

2. A brake comprising, in combination, a drum, a shoe pivotally anchored at one end within the drum in a manner permitting the anchored end to move radially against the drum, an unanchored shoe, a connection operated by the unanchored shoe to force the anchored shoe against the drum, means to force the unanchored shoe against the drum, and a spring arranged to insure engagement with the drum by the unanchored shoe prior to the anchored shoe.

3. A brake comprising, in combination, a drum, a shoe within the drum, a pin-and-slot anchor for one end of the shoe permitting it to move radially agains the drum, an unanchored shoe adjacent the unanchored end of the anchored shoe, a connection operated by movement of the unanchored shoe to force the anchored shoe against the drum, and means to force the unanchored shoe against the drum.

In testimony whereof, we affix our signatures.

VINCENT BENDIX.
ADIEL Y. DODGE.